United States Patent [19]

Terry

[11] Patent Number: 5,364,303

[45] Date of Patent: Nov. 15, 1994

[54] AIR VENT ADJUSTABLE VANES FOR CONTROLLING AIR FLOW DIRECTION

[75] Inventor: Warren W. Terry, Lawton, Mich.

[73] Assignee: Summit Polymers, Inc., Kalamazoo, Mich.

[21] Appl. No.: 89,432

[22] Filed: Jul. 9, 1993

[51] Int. Cl.$^5$ .......................... B60H 1/34; F24F 13/15
[52] U.S. Cl. ..................................... 454/155; 454/315; 454/320
[58] Field of Search ............... 454/109, 155, 202, 313, 454/315, 319, 320

[56] References Cited

U.S. PATENT DOCUMENTS

| | | |
|---|---|---|
| 2,034,231 | 3/1936 | Fox . |
| 2,224,312 | 12/1940 | O'Day . |
| 2,991,707 | 7/1961 | Goettl . |
| 3,636,854 | 1/1972 | Cary ..................... 454/319 |
| 3,648,590 | 3/1972 | Mercier ................. 454/155 |
| 3,802,328 | 4/1974 | Kakizaki . |
| 4,970,947 | 11/1990 | Soethout . |
| 5,036,753 | 8/1991 | Ostrand et al. ....... 454/155 |

FOREIGN PATENT DOCUMENTS

| | | |
|---|---|---|
| 60-244618 | 12/1985 | |
| 2029929 | 10/1970 | France . |
| 2619438 | 2/1989 | France ................. 454/155 |
| 2444116 | 3/1976 | Germany . |
| 58-33048 | 2/1983 | Japan . |
| 60-244619 | 12/1985 | Japan ................... 454/155 |
| 61-529 | 5/1986 | Japan ................... 454/155 |
| 718400 | 11/1954 | United Kingdom . |
| 1227157 | 4/1971 | United Kingdom . |
| 1295073 | 11/1972 | United Kingdom ... 454/313 |
| 1310009 | 3/1973 | United Kingdom . |

*Primary Examiner*—Harold Joyce
*Attorney, Agent, or Firm*—Varnum, Riddering, Schmidt & Howlett

[57] ABSTRACT

An air vent comprising a first row of air vanes for controlling the lateral orientation of air emitted from the air vent and a second row of air vanes for controlling the vertical orientation of air emitted from the air vent. The first and second row of air vanes can be adjusted independently. The first row of air vanes has a control vane to which is mounted a control knob. The control knob is connected to the second row of air vanes by a ball joint mounted pin, whereby the vertical movement of the control knob results in rotation of the second row of air vanes about a horizontal axis. The control knob is connected to the first row of air vanes by links. The lateral movement of the control knob results in a corresponding parallel rotational movement of the first row of air vanes to control the lateral position of a concentrated stream of the air emitted from the air vent. The control knob is mounted for outward movement which results in rotation of the first row of vanes into a diffused position to diffuse the air emitted from the air vent. The sets of end vanes in the first row of vanes are rotated away from the control knob when the control knob is pulled outwardly of the housing.

17 Claims, 6 Drawing Sheets

AIR VENT ADJUSTABLE VANES FOR CONTROLLING AIR FLOW DIRECTION

BACKGROUND OF THE INVENTION

1. Field of the Invention

This invention relates to an air vent. In one of its aspects, the invention relates to an air vent having adjustable vanes for controlling the direction of the air for directional deflection and for diffused flow.

2. Description of Related Art

In heating and cooling systems for automobiles, it is desirable to control the direction of the air emitted through the ducts so the vehicle operator can control the spacial heating or cooling of the vehicle. In a typical vehicle installation, multiple air vents are disposed across the vehicle dash at discrete locations. The air vents are preferably positioned so the air emitted by the heating and cooling system can be directed to either the front or rear seat areas of the vehicle.

It is common in contemporary vehicles for the air vents to control the lateral (side-to-side) air flow and the angular (floor-to-ceiling) air flow within the passenger compartment of the vehicle. The air vent generally comprises a housing having an opening in which are pivotally mounted multiple vanes that pivot about parallel and vertical or horizontal axes. The vanes are usually linked together for dependent movement, whereby the lateral air flow direction is controlled by pivoting the vanes about the vertical or horizontal axis.

The angular orientation of the air flow is generally controlled by one of two methods. The first method is to pivotally mount the air vent housing within the duct work. The housing is pivotally mounted about an axis of rotation that is substantially horizontal or vertical with respect to the housing outlet opening. Thus, as the housing is rotated about the axis, the angular orientation of the air flow can be directed anywhere from the ceiling to the floor, left or right, of the vehicle passenger compartment. The second method is to fixedly mount the air vent housing within the duct and pivotally mount a second set of dependently linked vanes within the housing. Each vane of the second set of vanes is pivotally mounted within the housing to rotate about parallel and generally horizontal or vertical axes, normal to the generally vertical or horizontal axes, whereby the angular orientation of the air flow being emitted from the air vent can be directed to any position from the ceiling to the floor, left or right.

Air vents that control only the lateral and angular orientation of the air flow are in some cases not completely satisfactory in that they do not provide any means for diffusing the air emitted from the vent. Often times, it is desireable to diffuse the emitted air to cover a wider area with a lower flow rate air stream rather than controlling only the lateral and angular position of a focused air stream. U.S. Pat. No. 5,036,753, issued Aug. 6, 1991, discloses an air vent for directing or diffusing the air emitted from the air vent. The air vent comprises three sets of laterally aligned and vertically oriented air vanes. The three sets of linearly aligned air vanes are linked for dependent lateral movement by a knob on one of the vanes. To diffuse the air emitted from the air vent, the outermost sets of air vanes are coupled by a singular wire to the knob by a rod, whereby rotation of the knob translates the rotary motion of the rod to linear motion of the wire to move the wire into an overcenter position, thereby deflecting air passing through the outermost sets of air vanes toward the central vanes to diffuse the air passing through the vanes.

SUMMARY OF INVENTION

The invention is directed to an air vent for a motor vehicle heating and cooling system. The air vent comprises a housing having an outlet opening in which is pivotally mounted a first row of vanes to control the direction of the air flow emitted from the outlet opening. The first row of vanes comprises two sets of end vanes located at opposite ends of the first row of vanes. The two sets of end vanes are separated by a control vane positioned therebetween. The first row of air vanes are linked in parallel to direct the air flow through the housing outlet and to rotate the two sets of end vanes transversely with respect to the control vane to diffuse the air passing through the outlet opening. An actuator is slidably mounted to the control vane and can be moved in a direction outwardly of the housing outlet opening. The actuator is connected to the two sets of end vanes by a first and second linkage. The first linkage has opposed ends with one end pivotally mounted to the actuator and the other end pivotally mounted to one set of the end vanes. Similarly, the second linkage has opposed ends with one end pivotally mounted to the actuator and the other end pivotally mounted to the other set of end vanes. Thus, movement of the actuator in a direction outwardly of the housing outlet opening rotates the two sets of end vanes in opposite directions to diffuse the air passing through the housing outlet opening.

Preferably, each vane of each set of end vanes is linked for parallel movement with respect to each other. The actuator is generally U-shaped and defines a channel for receiving the control vane so that the actuator is slidably mounted to the control vane by inserting the control vane into the actuator channel.

Further, the first and second linkages are preferably rigid and connect to the actuator by a pin and socket connection. The pivotal connection between the first and second linkages and the two sets of end vanes is preferably located inwardly with respect to the housing from the pivotal connection between the two sets of end vanes and the housing so that a front edge of the end vanes rotates away from the control vane as the actuator is moved outwardly of the housing to direct the air passing through the end vanes laterally away from the control vane.

In one aspect of the invention, a second row of vanes are pivotally mounted to the housing inwardly and transversely of the first row of vanes. The second row of vanes control the flow of air emitted from the outlet opening in a direction orthogonal to the direction of the first row of vanes. Each vane of the second row of vanes is linked together for parallel movement with respect to each other. A linkage between the actuator and the second row of vanes controls the rotational positioning of the second row of vanes with respect to the housing. Preferably, the linkage between the actuator and second row of vanes comprises a pin pivotally connected to the actuator by a ball and socket.

Preferably, the pin is connected to one of the vanes of the second row of vanes in a manner so that the slidable movement of the actuator along the control vane rotates the position of the second row of vanes. One vane of the second row of vanes has an arcuate cut-out for receiving the actuator so that pivotal movement of the actuator will not interfere with the position of the second row of vanes. One vane of the second row of vanes also has an opening for receiving the pin of the linkage so that the sliding movement of the actuator will correspondingly rotate the second row of vanes. Thus, the single actuator controls the movement of both the first and second rows of vanes and moves the first row of vanes from a diffused to a nondiffused position.

BRIEF DESCRIPTION OF THE DRAWINGS

The invention will now be described with reference to the drawings in which.

DESCRIPTION OF THE PREFERRED EMBODIMENTS

Figure 1:
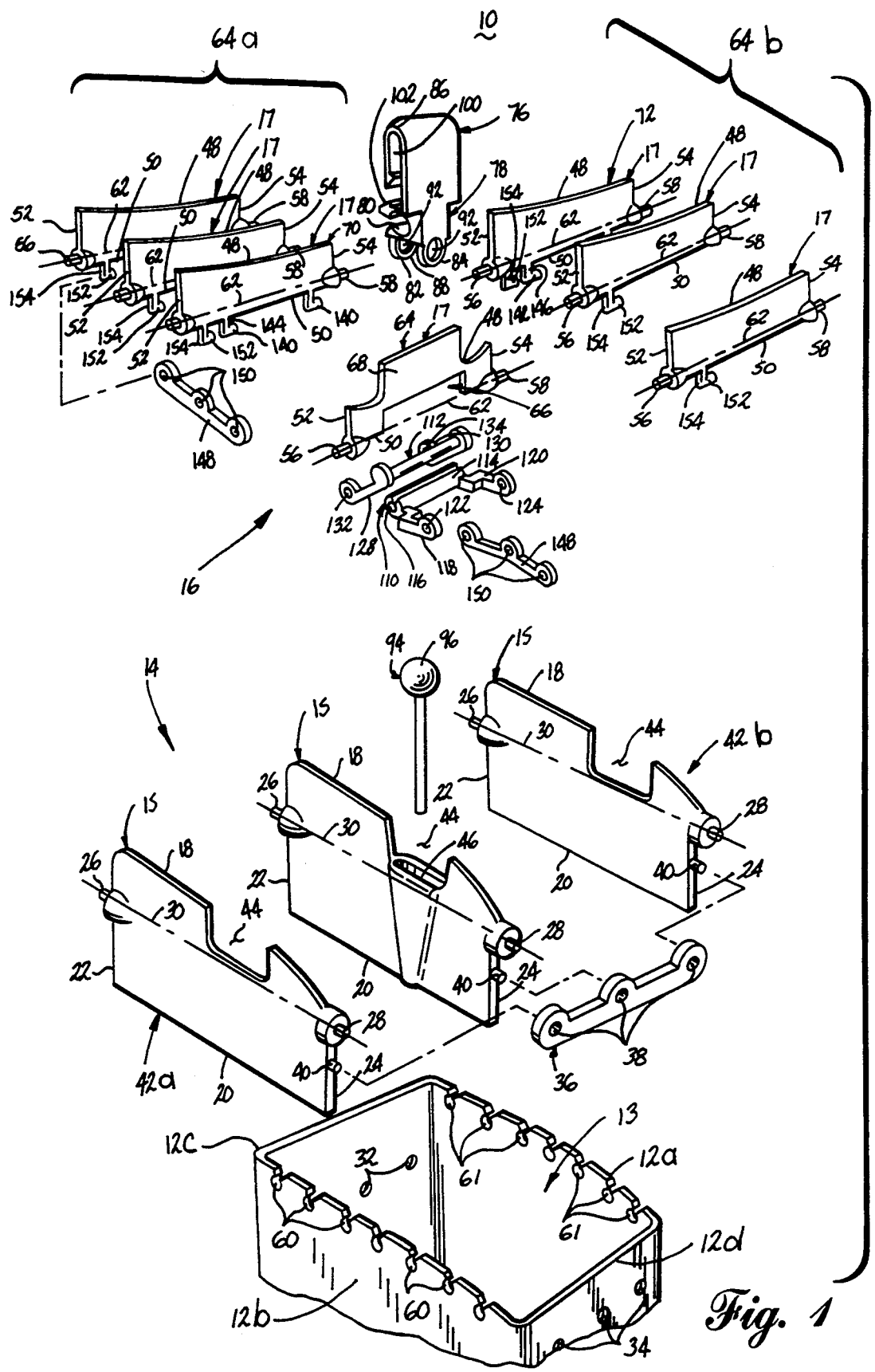
FIG. 1 is an exploded view of a first embodiment of the air vent according to the invention.
Figures 2, 3:
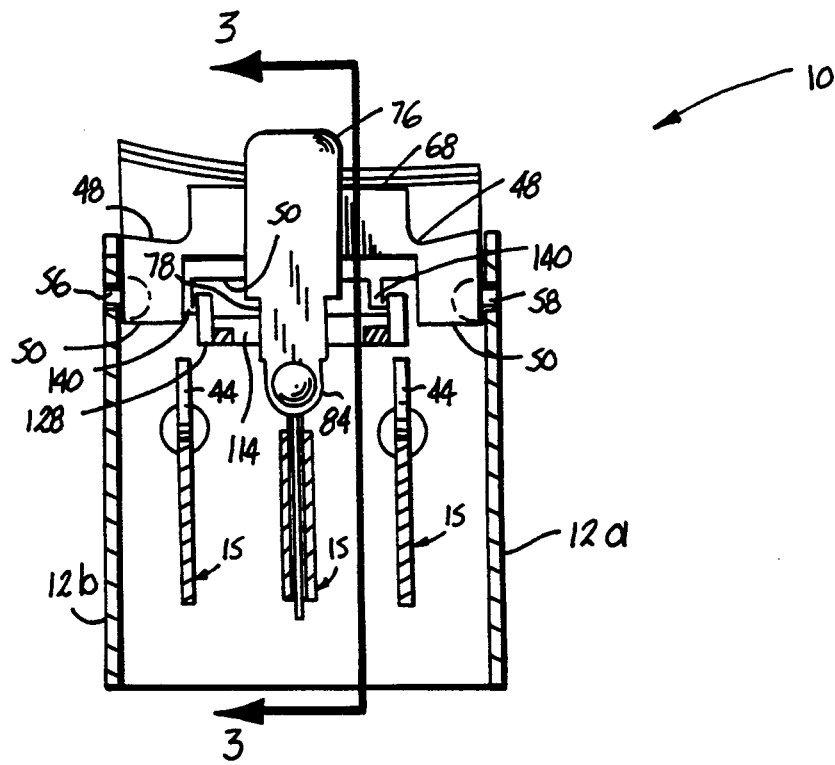
FIG. 2 is a right side view partially cut-away of the air vent according to the invention.
FIG. 3 is a view along line 3—3 of FIG. 2, illustrating the air vanes in the neutral position.

FIG. 1 illustrates the first embodiment of the air vent 10 according to the invention. The air vent 10 is shown in vertical orientation for purposes of illustration, but normally could be horizontally or vertically oriented when installed in a vehicle. The air vent 10 comprises a housing 12 with a top wall 12a, bottom wall 12b and opposed side walls 12c and 12d defining a housing outlet opening 13 in which are mounted a first row of air vanes 14 substantially parallel to the top wall 12a and bottom wall 12b. A second row of air vanes 16 is also mounted within the housing 12 substantially parallel to the side walls 12c, 12d. For purposes of description, the first row of vanes 14 will be referred to as the horizontally oriented vanes and the second row of vanes 16 will be referred to as the vertically orientated vanes. Although it should be understood that a particular orientation of the vanes is not necessary for the invention and the orientation of the first and second rows of vanes is easily altered by rotating the housing.

The horizontally oriented air vanes 14 control the angular direction of the air emitted from the air vent 10 and the second row of air vanes 16 control the lateral direction of the air emitted from the air vent 10. The housing 12 is shown having a curved front surface. However, the shape of the housing can be any desired shape for a particular application and is not limited to the curved, rectangular shape shown in FIG. 1.

The first row of air vanes 14 comprises multiple horizontal vanes 15 each having a front edge 18, a rear edge 20, and opposed side edges 22 and 24. The front edge 18 is illustrated having a curved shape, while the rear edge 20 and side edges 22, 24 are linear. However, it is noted that the edges can have any desired shape and preferably conform to the shape of the housing 12.

Pivot pins 26, 28 extend from each of the side edges 22, 24. The line connecting the pivot pins 26, 28 defines a horizontal axis 30 about which the horizontal air vanes 15 pivot after they are mounted to the housing 12 by snap-fitting the pivot pins 26, 28 into apertures 32, 34 in the air vent housing.

The horizontal air vanes 15 are operably connected as a unit by a link 36 having multiple link apertures 38 in which are inserted bosses 40 extending from one of the side edges 22 or 24. By operably linking the horizontal air vanes 15, the movement of one of the horizontal air vanes 15 induces a similar movement in the other air vanes 15 for dependent movement of the horizontal vanes 15 of the first row of air vanes 14.

One of the horizontal air vanes 15 is a first or rear control vane 42, separating the first row of vanes into a first end set 42a and second end set 42b which is actuated by the operator of the vehicle to induce the movement of the first row of air vanes 14. Preferably, the middle horizontal vane 15 is the control vane 42 and has a U-shaped cut-out 44 cut into the front edge 18. The U-shaped cut-out 44 terminates at a V-shaped opening 46 which tapers inwardly from the bottom of the U-shaped cut-out 44 to the rear edge 20, of one of the vanes 42 preferably the middle vane. The remaining horizontal air vanes 15 have an identical U-shaped cut-out 44. The V-shaped opening 46 and U-shaped cut-out 44 are adapted to receive a control knob or actuator for initiating the angular movement of the horizontal vanes 15. The actuator or control knob is described in more detail below.

The second row of air vanes 16 comprises multiple vertical air vanes 17 disposed in parallel relationship within the housing sides 12c and 12d of the air vent 10. Each of the vertical air vanes 17 has a front edge 48, rear edge 50, and side edges 52, 54. Pivot pins 56, 58 extend outwardly from the side edges 52, 54 and are snap-fitted into vertical vane housing openings 60, 61. The line connecting the pivot pins 56 and 58 of each vertical air vane 17 defines a vertical axis 62 about which the vertical air vanes 17 rotate. The vertical air vanes 17 are illustrated as having a concave front edge 48 and linear rear edge 50 and side edges 52, 54. However, it should be noted that the shape of the vertical air vanes 17 can have any desired shape depending on the particular application.

One of the vertical air vanes 17 is a second or front control vane 64. Preferably, the middle vertical air vane 17 is the control vane 64, which divides the second row of vanes 16 into a first end set 64a and a second end set 64b. The front control vane 64 has a notch 66 in the rear edge 50 and a tab 68 extending from the front edge 48. The vertical air vanes immediately adjacent the front control vane 64 are connector vanes 70 and 72.

A control knob 76 is slidably mounted to the tab 68 of the front control vane 64. The control knob 76 comprises a base portion 78 having a C-shaped channel 80 from which extend opposed flanges 82, 84 and a hook portion 86. The opposed flanges 82, 84 have aligned openings 90, 92 and define a ball channel 88. A ball socket connector 94 comprising a ball 96 and pin 98 is mounted within the ball channel 88 by snap-fitting the ball 96 into the aligned openings 90, 92 between the opposed flanges 82, 84 so that the ball is free to rotate within the channel.

The hook portion 86 defines a tab channel 100 in which the tab 68 is slidably received. A snap flange 102 extends outwardly from the base portion 78 of the control knob 76 and opposes the hook portion 86 and securely retains the control knob 76 to the tab 68 by snap-fitting the control knob 76 to the tab 68. When the control knob 76 is mounted to the tab 68, the opposed flanges 82, 84 are positioned so they will remain within the U-shaped cut-outs 44 of the horizontal air vanes 15 as the control knob is used to rotate the front control vane 64. The pin 98 of the ball socket connector passes through the U-shaped opening 44 in the rear control vane 42 to adjust the angular position of the rear control vane 42.

The front control vane 64 is linked to the connector vanes 70 and 72 by an outer link 110 and an inner link 112. The outer link 110 has a C-shaped shaft 114 with a channel 116 and from which extends opposed link arms 118, 120, each having axially aligned link apertures 122, 124.

The inner link 112 comprises a shaft 126 connecting opposed link arms 128, 130, each having axially aligned link apertures 132, 134. The shaft 126 is snap-fit within the channel 116 of the outer link 110. The C-shaped shaft 114 of the outer link 110 is snap-fitted within the C-shaped control knob channel 80 of the control knob 76, whereby the outer link 110 and inner link 112 rotate about the axial axis of the control knob channel 80.

The axially aligned link apertures 122, 124 and 132, 134 of the outer link 110 and inner link 112, respectively, are snap-fit onto inner link bosses 140 and outer link bosses 142 mounted to the connector vanes 70 and 72 by lever arms 144, 146, respectively, to connect the front control vane 64 to the connector vanes 70 and 72.

The remaining vertical air vanes 17 are linked directly to one of the connector vanes 70 and 72 by a horizontal link 148 having multiple apertures 150 corresponding to vertical air vane bosses 152 mounted to each connector vane 70 and 72 and each remaining vertical air vane 17 by lever arms 154.

In operation, the angular orientation of the air emitted by the air vent 10 is controlled by sliding the control knob 76 vertically with respect to the front control vane 64. As the front control knob is slid along the front control vane 64, the pin 98 moves the rear control vane 42, which results in a corresponding movement of the rear control vane 42 as it pivots about the horizontal axis 30. As the rear control vane 42 pivots about the horizontal axis, the horizontal air vane link 36 causes a corresponding rotation in all the horizontal air vanes 15 about their respective horizontal axis 30.

To control the lateral orientation of the air emitted from the air vent 10, the control knob 76 is moved laterally to rotate the front control vane 64 about the vertical axis 62, resulting in a corresponding parallel movement of the remaining vertical air vanes 17. As the control knob 76 is moved laterally and pivoted about the vertical axis 62, the opposed flanges 82, 84 traverse an arc disposed entirely within the U-shaped cut-out 44 of the rear control vane 42 so as not to alter the position of the horizontal vanes 15. Correspondingly, the ball 96 pivots within the ball channel 88 so that the pin 98 slides within the V-shaped opening 46. Thus, the lateral movement of the vertical air vane 17 is independent of the position and movement of the horizontal air vanes 15.

Figure 4:
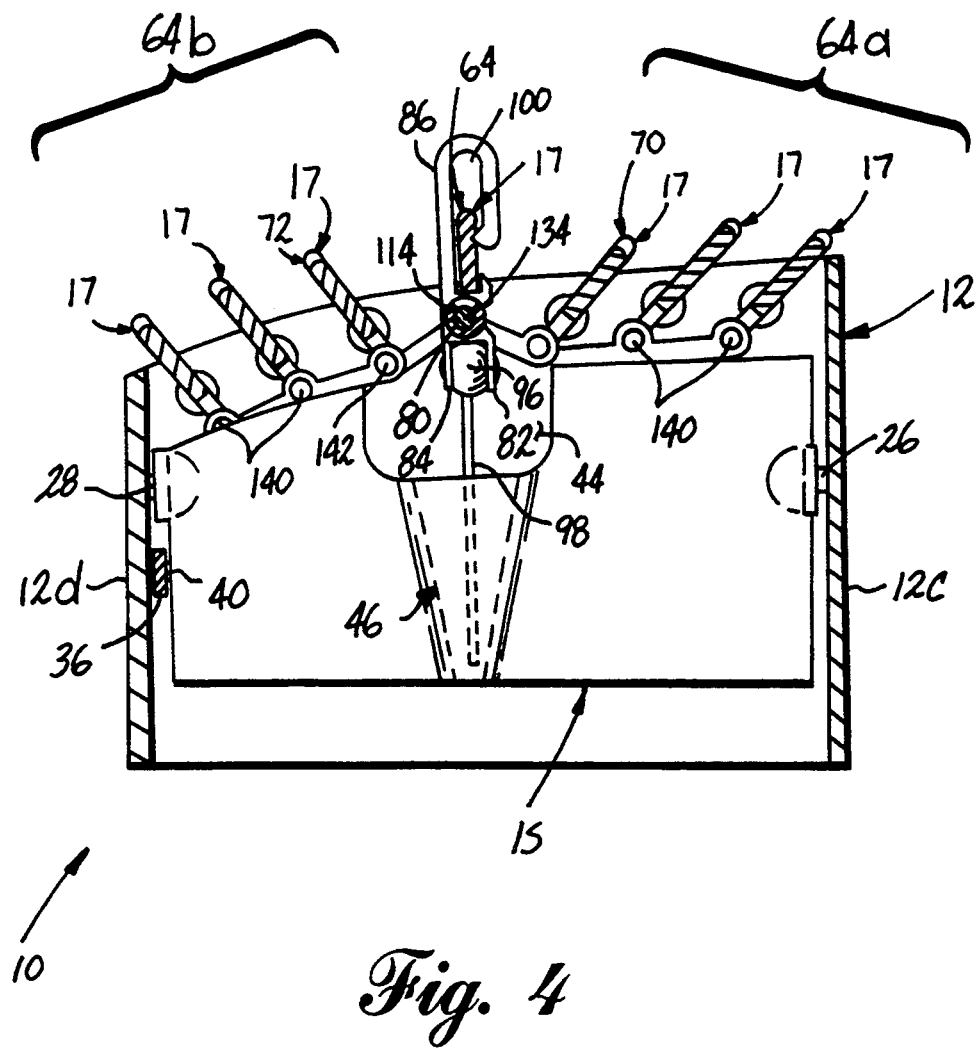
FIG. 4 is substantially similar to FIG. 3, except that the air vanes are shown in the diffused position.

To place the vertical air vanes 17 in the diffused mode as illustrated in FIG. 4, the control knob 76 is pulled forwardly (upwardly in FIG. 4). As the control knob 76 is pulled forwardly, the outer link 110 and inner link 112 rotate the lever arms 144, 146 of the connector vanes 70 and 72 inwardly toward the control knob 76, resulting in the front edge 48 of the vertical air vanes 17 pivoting away from the control knob 76 and front control vane 64 to orient the first and second end vane sets 42a, 42b substantially transverse to the second or front control vane 64 and to disperse the air emitted from the air vent 10.

Figure 5:
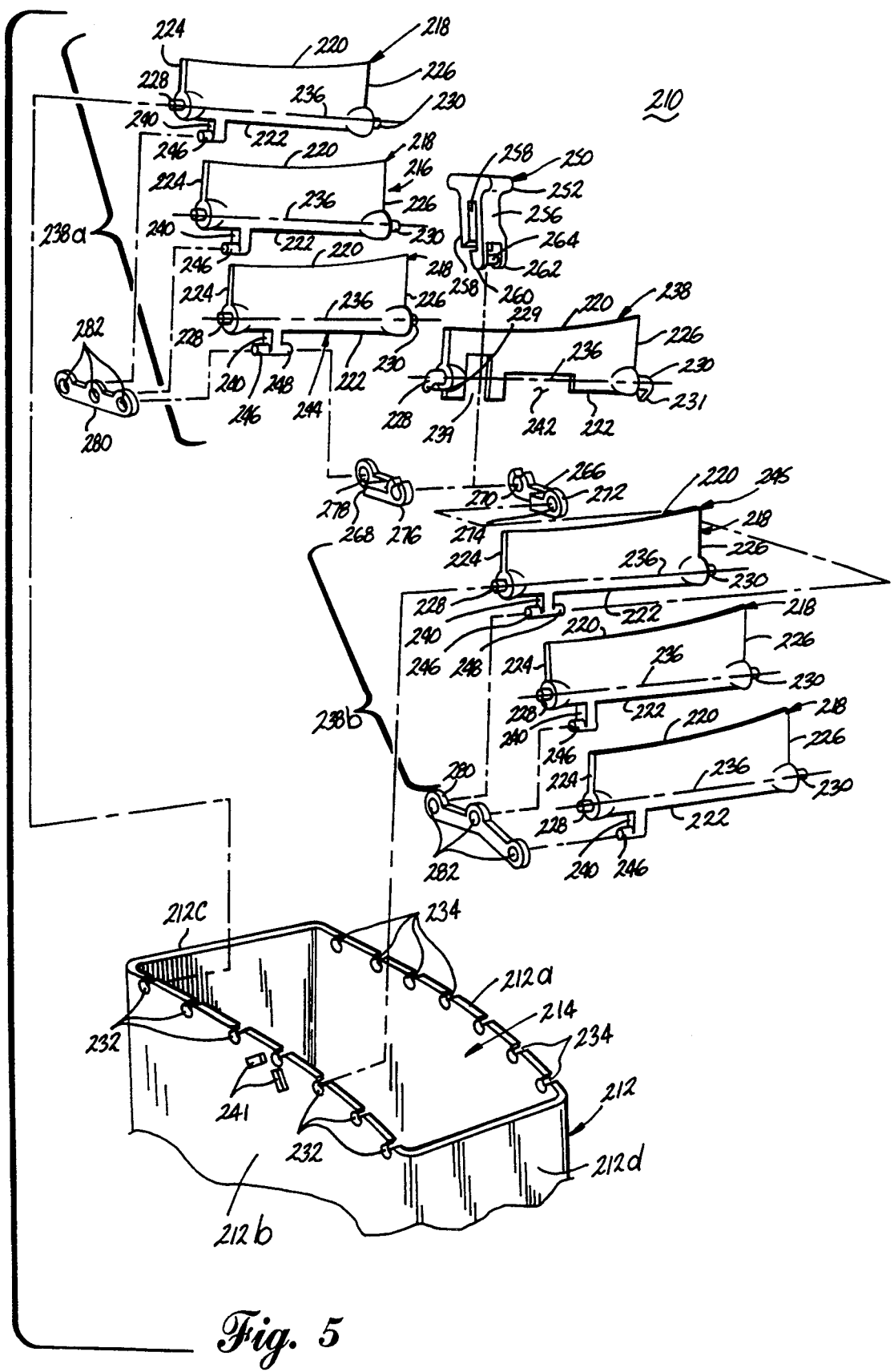
FIG. 5 is an exploded view of a second embodiment according to the invention.
Figure 6:
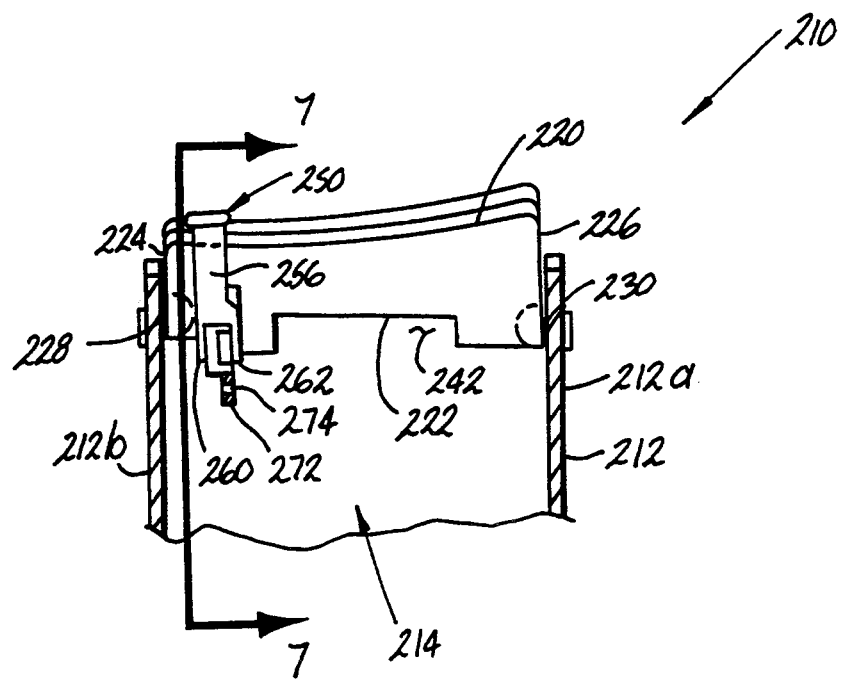
FIG. 6 is a right side view partially broken away of the second embodiment.
Figure 7:
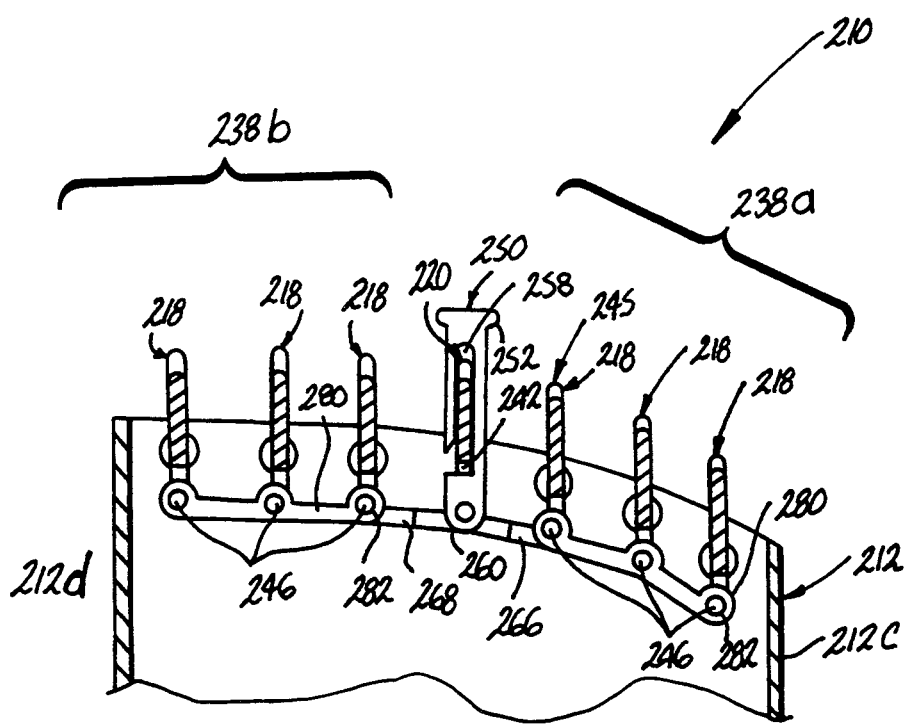
FIG. 7 is a view along line 7—7 in FIG. 6, illustrating the vanes in the neutral position.

The second embodiment according to the invention is disclosed in FIGS. 5-8. FIGS. 5-7 disclose an air vent 210 comprising a housing 212 having a top wall 212a, bottom wall 212b and opposed side walls 212c and 212d which define an air vent outlet opening 214. A first row of air vanes 216 is disposed within the air vent housing 212 substantially parallel to the sidewalls 212c and 212d. For description purposes, the first row of air vanes will be referred to as vertically oriented air vanes 218. The first row of air vanes 216 comprises multiple vertical air vanes 218 oriented vertically with respect to the air vent outlet opening 214 to control the lateral direction of the air emitted from the air vent 210. Although not shown in FIGS. 5-8, it is within the scope of the invention to incorporate a second set of air vanes substantially oriented horizontally with respect to the air vent outlet opening 214 to control the angular orientation of the air emitted from the air vent 210. For simplicity, the second row of air vanes has not been shown.

The vertical air vanes 218 have a front edge 220, rear edge 222 and side edges 224 and 226, which define the plan-form of the air vanes 218. Each side 224 and 226 have a pivot pin 228 and 230, which are snap-fitted within spaced housing apertures 232 and 234 to pivotally mount the vertical air vanes 218 to the air vent housing 212. The line connecting the pivot pins 228 and 230 defines a vertical axis of rotation about which the air vanes 218 rotate. The front edge 220 of the air vanes 218 is concave and the rear edge 222 and side edges 224 and 226 are linear and define a substantially rectangular shape. However, it should be noted that the shape of the air vanes 218 can be any desired shape.

One of the air vanes 218 is a control vane 238. Preferably, the middle air vane 218 is the control vane 238. The pivot pins 228 and 230 of the control vane 238 have tabs 229 and 231, respectively, which engage paired stops 241 to limit the rotational movement of the control vane 238. The control vane 238 has a first and second notch 239, 242 disposed in its rear edge 222. The vertical air vanes 218 immediately adjacent the control vane 238 are connector vanes 244, 245 and have a rearwardly extending lever arm 240 with an upwardly extending horizontal link boss 246 and a downwardly extending control link boss 248. The other vertical air vanes 218 similarly have a lever arm 240 from which extends only the horizontal link boss 246.

A dispersion control knob 250 is mounted within the first notch 239. The control knob 250 comprises a finger pull 252 from which extend opposing and parallel first and second flanges 254 and 256 to define a control vane channel 258. The first flange 254 is slightly shorter in length than the second flange 256. The end of the second flange 256 terminates in opposed mounting tabs 260 and 262, between which is mounted a link pin 264. The control knob 250 is mounted to the control vane 238 by snap-fitting the control vane 238 into the control vane channel 258 so the first and second flanges 254, 256 of the control knob 250 are disposed within the first notch 239 of the control vane 238.

The control vane 238 is coupled to the connector air vanes 244 and 245 by first and second links 266 and 268. The first link 266 comprises a hook 270 connected to a downwardly stepped portion 272 having a link aperture 274. The amount of downward step is substantially equal to the thickness of the first link 266. The second link 268 also has a hook portion 276 and a link aperture 278, but does not have a downwardly stepped portion. The first link 266 is connected to the control knob 250 by snap-fitting the hook 270 to the link pin 264. The second link 268 is connected to the control knob 250 by snap-fitting the hook 276 to the link pin 264 below the first link 266. When the first link 266 and second link 268 are mounted in this orientation, the hook apertures 274 and 278 are at substantially the same vertical position along the rear edge of the control vane 238. Each of the first link 266 and second link 268 are connected to one of the immediately adjacent vertical air vanes 218 by snapping the control link boss 248 into the link apertures 274 and 278. The remaining vertical air vanes 218 are connected as first and second end sets 238a and 238b by horizontal links 280. The horizontal links 280 have horizontal link apertures 282, which are spaced the same distance as the vertical air vanes 218. The horizontal link bosses 246 are snap-fitted into the horizontal link apertures 282.

The air vent 210 can be operated in a neutral or a diffused mode. In the neutral mode, the link pin 264 is substantially aligned and parallel with the horizontal link bosses 246 for each vertical air vane 218 so the horizontal links 280, first link 266 and second link 268 are aligned. Thus, when the control vane 238 is rotated about the vertical axis 236 by lateral manipulation of the control knob 250, the air vanes 218 correspondingly rotate in parallel to control the lateral direction of a concentrated stream of the air emitted from the air vent 210 outlet opening.

Figure 8:
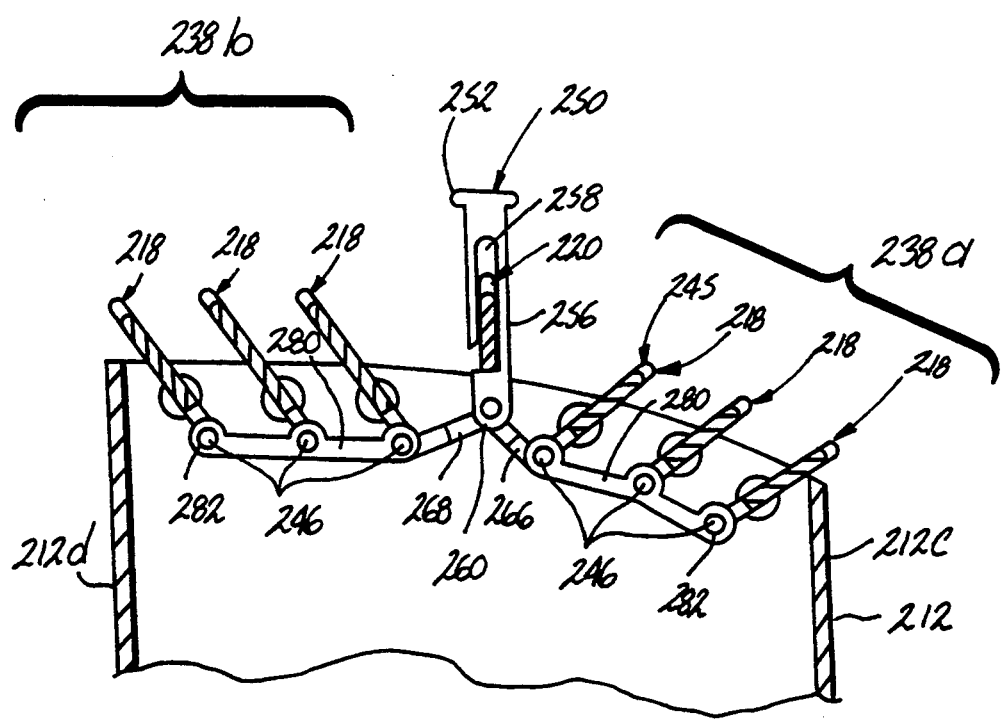
FIG. 8 is similar to FIG. 7, but illustrating the vanes in the diffused position.

In the diffused mode, the control knob 250 is pulled forwardly (upwardly in FIG. 8) so that the link pin 264 is disposed forward of the horizontal link bosses 246, resulting in the inward rotation of the rear edge 222 of the connecting vanes toward the control vane 238. Simultaneously, the first end vane set 238a and second end vane set 238b rotate inwardly in response to the movement of the horizontal links 280 to a position substantially transverse of the control vane 238 as shown in FIG. 8 to diffuse the air emitted from the outlet opening of the air vent 210.

The invention provides a simple and straightforward air vent to control the direction of flow of air in a concentrated form from side-to-side of the outlet opening and also provide for diffused flow of air through the outlet opening. The linkages are easily snapped together for ease of assembly. All parts can be made of plastic.

While particular embodiments of the invention have been shown, it will be understood, of course, that the invention is not limited thereto since modifications may be made by those skilled in the art, particularly in light of the foregoing teachings. For example, the control vane can be positioned to one side or the other of the housing. Further, there can be two or more central vanes which can rotate in unison with the control vane and be independent of the end vanes. Reasonable variation and modification are possible within the scope of the foregoing disclosure of the invention without departing from the spirit of the invention.

The embodiments of the invention in which an exclusive property or privilege is claimed are defined as follows:

1. An air vent for a motor vehicle heating and cooling system comprising:
   a housing having an outlet opening;
   a first row of vanes pivotally mounted to the housing to control the direction of the flow of air emitted from the outlet opening, the first row of vanes comprising two sets of end vanes located at opposite ends of the first row of vanes and a control vane positioned between the two sets of end vanes;
   a linkage for rotating the first row of air vanes in parallel to direct the air flow through the housing outlet and for rotating the two sets of end vanes transversely with respect to the control vane to diffuse the air passing through the outlet;
   the improvement comprising:
   an actuator slidably mounted to the control vane for movement in a direction outwardly of the housing outlet opening;
   a first linkage having opposed ends with one end pivotally mounted to the actuator and the other end pivotally mounted to one set of the end vanes at one end of the first row of vanes;
   a second linkage having opposed ends with one end pivotally mounted to the actuator and the other end to the other set of end vanes at the other end of the first row;
   whereby movement of the actuator in a direction outwardly of the housing outlet opening rotates the two sets of end vanes in opposite directions to diffuse the air passing through the housing outlet.

2. An air vent according to claim 1 wherein the vanes of each set of end vanes are linked for parallel movement with respect to each other.

3. An air vent according to claim 1 wherein the first and second linkages are rigid.

4. An air vent according to claim 3 wherein the first and second linkages are connected to the actuator by a pin and socket connection.

5. An air vent according to claim 1 wherein the actuator is U-shaped and defines a channel for receiving the control vane to slidably mount the actuator to the control vane.

6. An air vent according to claim 1 wherein the first and second linkages are pivotally connected to the two sets of end vanes inwardly with respect to the housing from the pivotal connection between the two sets of end vanes and the housing so that a front edge of the end vanes rotates away from the control vane as the actuator is moved outwardly of the housing to direct the air passing through the end vanes laterally away from the control vane, 7. An air vent according to claim 1 wherein the first and second linkages are connected to the actuator by a pin and socket connection.

8. An air vent according to claim 1 and further comprising a second row of vanes pivotally mounted to the housing inwardly and transversely of the first row of vanes to control the flow of air emitted from the outlet opening in a direction orthogonal to the direction of the first row of vanes, each vane of the second row of vanes is linked together for parallel movement with respect to each other and a linkage between the actuator and the second row of vanes to control the rotational positioning of the second row of vanes with respect to the housing.

9. An air vent according to claim 8 wherein the linkage between the actuator and second row of air vanes comprises a pin pivotally connected to the actuator by a ball and socket and the pin is connected to one of the vanes of the second row of vanes, whereby slidable movement of the actuator along the control vane rotates the position of the second row of vanes.

10. An air vent according to claim 9 wherein one vane of the second row of vanes has an arcuate cut-out in which the actuator and linkage are disposed so that pivotal movement of the actuator will not interfere with the position of the second row of vanes.

11. An air vent according to claim 10 wherein one vane of the second row of vanes has an opening for receiving the pin so that sliding movement of the actuator will correspondingly rotate the second row of vanes.

12. An air vent according to claim 8 wherein the actuator is U-shaped and defines a channel for receiving the control vane to slidably mount the actuator to the control vane so that by sliding the actuator longitudinally with respect to the control vane the second row of vanes is rotated.

13. An air vent according to claim 8 wherein the vanes of each set of end vanes are linked for parallel movement with respect to each other.

14. An air vent according to claim 8 wherein the first and second linkages are rigid.

15. An air vent according to claim 14 wherein the first and second linkages are connected to the actuator by a pin and socket connection.

16. An air vent according to claim 8 wherein the first and second linkages are pivotally connected to the two sets of end vanes inwardly with respect to the housing from the pivotal connection between the two sets of end vanes and the housing so that a front edge of the end vanes rotates away from the control vane as the actuator is moved outwardly of the housing to direct the air passing through the end vanes laterally away from the control vane.

17. An air vent according to claim 8 wherein the first and second linkages are connected to the actuator by a pin and socket connection.

* * * * *